United States Patent
Fukuda et al.

(10) Patent No.: US 12,128,871 B2
(45) Date of Patent: Oct. 29, 2024

(54) CONTROL DEVICE FOR HYBRID ELECTRIC VEHICLE

(71) Applicant: TOYOTA JIDOSHA KABUSHIKI KAISHA, Aichi-ken (JP)

(72) Inventors: Atsushi Fukuda, Nisshin (JP); Eiichiroh Kido, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 188 days.

(21) Appl. No.: 17/979,764

(22) Filed: Nov. 3, 2022

(65) Prior Publication Data

US 2023/0234555 A1 Jul. 27, 2023

(30) Foreign Application Priority Data

Jan. 21, 2022 (JP) ................. 2022-007707

(51) Int. Cl.
*B60W 20/14* (2016.01)
*B60W 10/02* (2006.01)
*B60W 10/06* (2006.01)
*B60W 10/08* (2006.01)
*B60W 30/18* (2012.01)
*F02D 41/04* (2006.01)

(52) U.S. Cl.
CPC ............ *B60W 20/14* (2016.01); *B60W 10/02* (2013.01); *B60W 10/06* (2013.01); *B60W 10/08* (2013.01); *B60W 30/18127* (2013.01); *F02D 41/042* (2013.01); *B60W 2510/244* (2013.01)

(58) Field of Classification Search
CPC ...... B60W 20/14; B60W 10/02; B60W 10/06; B60W 10/08; B60W 30/18127; B60W 2510/244; B60W 2510/0638; B60W 2510/081; B60W 2030/1809; B60W 2710/0644; B60W 2710/081; B60W 20/10; B60W 20/17; B60W 30/18109; B60W 20/40; F02D 41/042; F02D 41/123; F02D 2200/101; B60K 2006/4825; B60K 6/48; Y02T 10/62
See application file for complete search history.

(56) References Cited

FOREIGN PATENT DOCUMENTS

| | | | |
|---|---|---|---|
| JP | 2013123939 A | 6/2013 | |
| JP | 2013180695 A | 9/2013 | |
| JP | 202154135 A | 4/2021 | |
| WO | WO-2020199909 A1 * | 10/2020 | ............... B60K 6/26 |

OTHER PUBLICATIONS

Machine Translation of WO 2020199909 A1 Pdf File Name: "WO2020199909A1_Machine_Translation.pdf".*

* cited by examiner

Primary Examiner — Grant Moubry
Assistant Examiner — Ruben Picon-Feliciano
(74) Attorney, Agent, or Firm — HAUPTMAN HAM, LLP

(57) ABSTRACT

A control device performs braking using a regenerative brake based on power generation in a motor generator in motor-driven traveling and performs a battery protecting process of starting an engine to set up transmission of a driving force between the motor generator and the engine using a clutch and performing braking based on an engine brake when a state of charge of a battery is equal to or greater than a threshold value in the motor-driven traveling. The control device sets a fuel-cutoff-permission rotation speed to a second rotation speed lower than a first rotation speed when the engine is started through the battery protecting process.

3 Claims, 5 Drawing Sheets

COMPLETION OF ROTATION SYNCHRONIZATION

ROTATION SPEED

CLUTCH ENGAGEMENT FACTOR

TORQUE

TIME

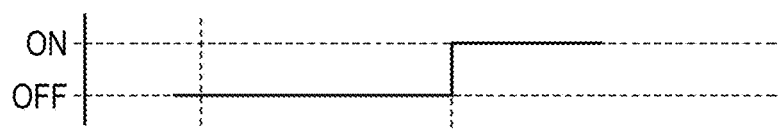
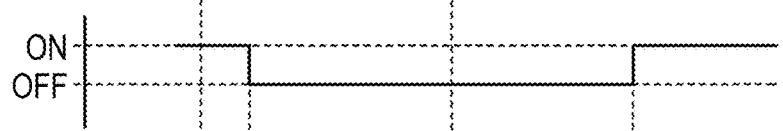
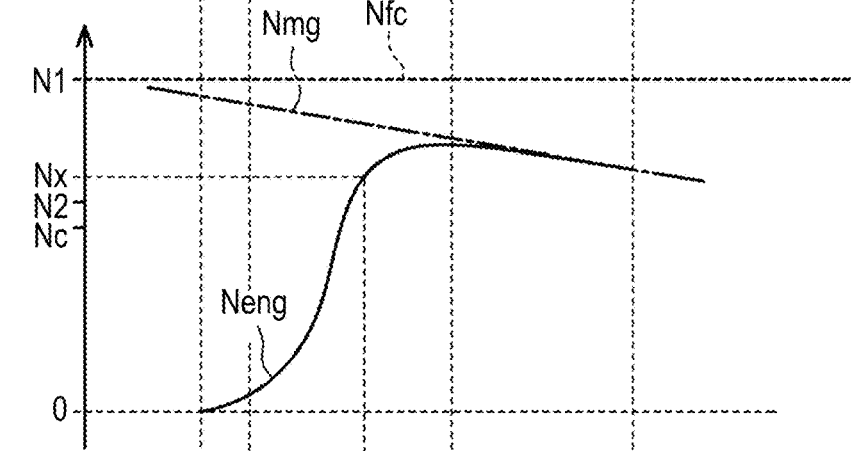
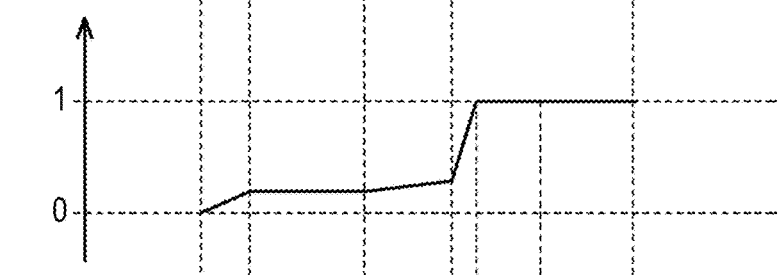
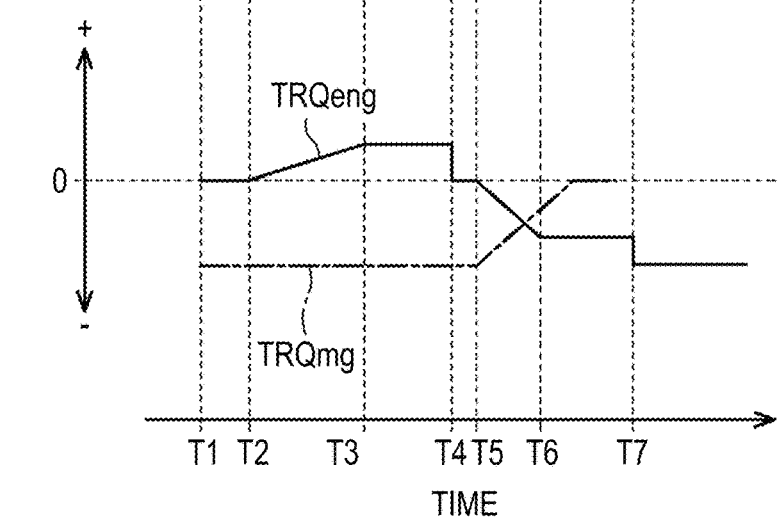

FIG. 5A COMPLETION OF ROTATION SYNCHRONIZATION
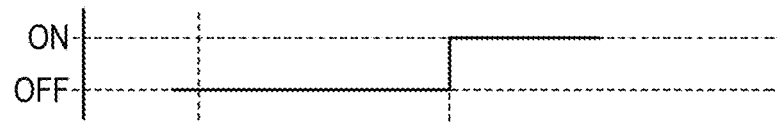
FIG. 5B FUEL CUTOFF SIGNAL
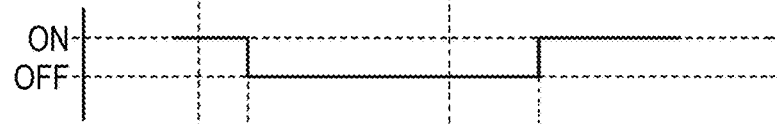
FIG. 5C ROTATION SPEED
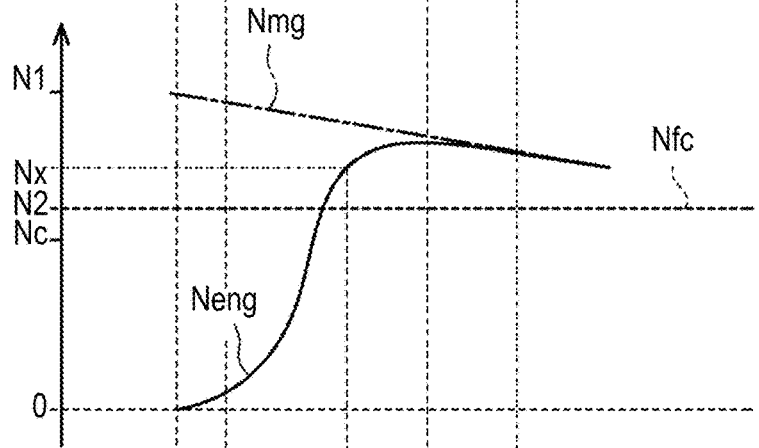
FIG. 5D CLUTCH ENGAGEMENT FACTOR
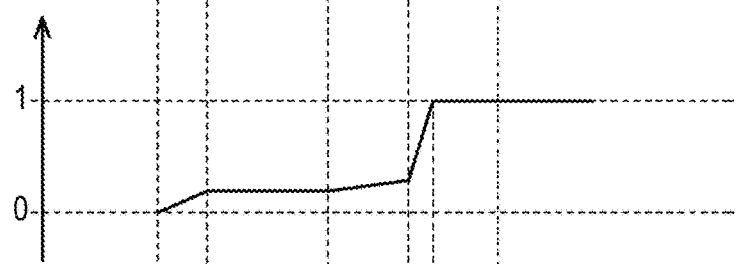
FIG. 5E TORQUE
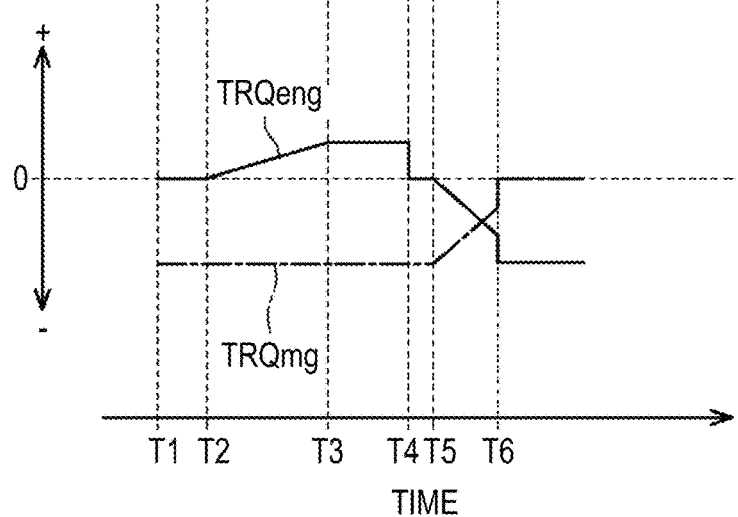

CONTROL DEVICE FOR HYBRID ELECTRIC VEHICLE

CROSS-REFERENCE TO RELATED APPLICATION

This application claims priority to Japanese Patent Application No. 2022-007707 filed on Jan. 21, 2022, incorporated herein by reference in its entirety.

BACKGROUND

1. Technical Field

The disclosure relates to a control device for a hybrid electric vehicle.

2. Description of Related Art

Japanese Unexamined Patent Application Publication No. 2013-180695 (JP 2013-180695 A) discloses a hybrid electric vehicle including a clutch between an engine and a motor generator. This hybrid electric vehicle may perform motor-driven traveling in which the hybrid electric vehicle travels using a driving force of the motor generator without using a driving force of the engine in a state in which the clutch is disengaged such that transmission of a driving force between the engine and the motor generator is cut off.

The hybrid electric vehicle can perform braking using a regenerative brake that generates a braking force by generating electric power using the motor generator at the time of deceleration. By using such a regenerative brake, kinetic energy can be converted to electric power and the electric power can be stored in a battery.

In JP 2013-180695 A, it is disclosed that the engine is started to engage the clutch when a state of charge of the battery becomes equal to or greater than a threshold value in motor-driven traveling. In this way, an engine brake is operated in a state in which the transmission of a driving force between the engine and the motor generator is set up. Accordingly, it is possible to supply a braking force which cannot be supplied by the regenerative brake based on the engine brake while preventing the state of charge of the battery from becoming excessive.

SUMMARY

When the engine is started to engage the clutch, a shock due to engagement of the clutch is curbed by controlling the torque of the engine. When the state of charge of the battery is equal to or greater than the threshold value as described above, there is demand for rapidly generating the braking force from the engine brake.

According to an aspect of the disclosure, there is provided a control device for a hybrid electric vehicle including a motor generator connected to driving wheels and an engine as drive sources, the hybrid electric vehicle being configured to set up or cut off transmission of a driving force between the motor generator and the engine using a clutch. The control device performs braking using a regenerative brake based on power generation in the motor generator in motor-driven traveling in which the hybrid electric vehicle is traveling using a driving force of the motor generator in a state in which operation of the engine is stopped and the transmission of a driving force between the motor generator and the engine using the clutch is cut off. The control device performs a battery protecting process of starting the engine to set up the transmission of a driving force between the motor generator and the engine using the clutch and performing braking based on an engine brake when a state of charge of the battery is equal to or greater than a threshold value in the motor-driven traveling.

The control device sets a fuel-cutoff-permission rotation speed which is a lower limit of an engine rotation speed at which execution of fuel cutoff in the engine is permitted to a first rotation speed when the engine is started, and sets the fuel-cutoff-permission rotation speed to a second rotation speed lower than the first rotation speed when the engine is started through the battery protecting process.

The control device with this configuration sets the fuel-cutoff-permission rotation speed to the second rotation speed lower than the first rotation speed when the engine is started through the battery protecting process. Accordingly, the control device can perform fuel cutoff at a lower engine rotation speed in comparison with a case in which the fuel-cutoff-permission rotation speed is set to the first rotation speed. Accordingly, when the transmission of a driving force between the motor generator and the engine is set up, fuel cutoff can be more easily performed. As a result, the control device can rapidly generate a braking force based on the engine brake when the state of charge of the battery is equal to or greater than the threshold value.

In the control device for a hybrid electric vehicle according to the aspect, the second rotation speed may be a value obtained by adding a second addition value to a return rotation speed which is a lower limit of an engine rotation speed range in which maintenance of fuel cutoff is permitted, and the first rotation speed may be a value obtained by adding a first addition value greater than the second addition value to the return rotation speed.

When the engine is operating and the engine rotation speed is equal to or greater than the fuel-cutoff-permission rotation speed, fuel cutoff is performed. Then, the control device ends the fuel cutoff and restarts fuel injection when the engine rotation speed is less than the return rotation speed.

When the fuel-cutoff-permission rotation speed and the return rotation speed are excessively close to each other, hunting in which execution and stopping of fuel cutoff are repeated can occur easily. Therefore, a sum obtained by adding an addition value to the return rotation speed is set as the fuel-cutoff-permission rotation speed. As a result, it is possible to curb occurrence of hunting by adjusting the magnitude of the addition value.

When the engine is started, there is a likelihood that a combustion state will be unstable and the engine rotation speed will overshoot. At this time, when the fuel-cutoff-permission rotation speed is set to a lower value, the engine rotation speed easily exceeds the fuel-cutoff-permission rotation speed. As a result, fuel cutoff is performed and starting is likely to fail. When the engine is started, it is possible to avoid this situation by setting the fuel-cutoff-permission rotation speed to a higher value.

When the engine is started, the control device sets the fuel-cutoff-permission rotation speed to the first rotation speed which is a sum obtained by adding the first addition value to the return rotation speed. The first addition value is greater than the second addition value. Accordingly, the control device can curb a starting failure of the engine in contrast with a case in which the fuel-cutoff-permission rotation speed is set to the second rotation speed which is a sum obtained by adding the second addition value to the return rotation speed.

In the control device for a hybrid electric vehicle according to the aspect, in transition control for transitioning to a state in which the transmission of a driving force between the motor generator and the engine is set up using the clutch by starting the engine in the motor-driven traveling, a torque interchanging process of gradually decreasing a torque of the engine and gradually increasing a torque of the motor generator until the operation of the engine is stopped is performed after engagement of the clutch has been completed.

The control device with this configuration can curb fluctuation of a driving force for the hybrid electric vehicle in completing transition to motor-driven traveling in a state in which the transmission of a driving force between the motor generator and the engine is set up by stopping the operation of the engine.

In the control device for a hybrid electric vehicle according to the aspect, the transition control may be ended by performing fuel cutoff and ending the torque interchanging process when the engine is started through the battery protecting process.

The control device can rapidly generate a braking force based on the engine brake and rapidly end the transition control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a timing chart illustrating transition control at the time of starting an engine according to a comparative example, where a change of a rotation synchronized state is illustrated:

FIG. 3B is a timing chart illustrating transition control at the time of starting an engine according to the comparative example, where a change of a fuel cutoff signal state is illustrated:

FIG. 3C is a timing chart illustrating transition control at the time of starting the engine according to the comparative example, where a change of a rotation speed is illustrated:

FIG. 3D is a timing chart illustrating transition control at the time of starting the engine according to the comparative example, where a change of an engagement factor of a clutch is illustrated;

FIG. 3E is a timing chart illustrating transition control at the time of starting the engine according to the comparative example, where a change of a torque is illustrated:

FIG. 5A is a timing chart illustrating transition control which is performed by the control device at the time of deceleration in motor-driven traveling, where a change of a rotation synchronized state is illustrated:

FIG. 5B is a timing chart illustrating transition control which is performed by the control device at the time of deceleration in motor-driven traveling, where a change of a fuel cutoff signal state is illustrated:

FIG. 5C is a timing chart illustrating transition control which is performed by the control device at the time of deceleration in motor-driven traveling, where a change of a rotation speed is illustrated:

FIG. 5D is a timing chart illustrating transition control which is performed by the control device at the time of deceleration in motor-driven traveling, where a change of an engagement factor of a clutch is illustrated; and FIG. 5E is a timing chart illustrating transition control which is performed by the control device at the time of deceleration in motor-driven traveling, where a change of a torque is illustrated.

DETAILED DESCRIPTION OF EMBODIMENTS

Hereinafter, a control device 23 which is an embodiment of a control device for a hybrid electric vehicle will be described with reference to FIGS. 1 to 5E.

Configuration of Hybrid Electric Vehicle

A configuration of a drive system of a hybrid electric vehicle that is controlled by the control device 23 according to the embodiment will be described below.

Figure 1:
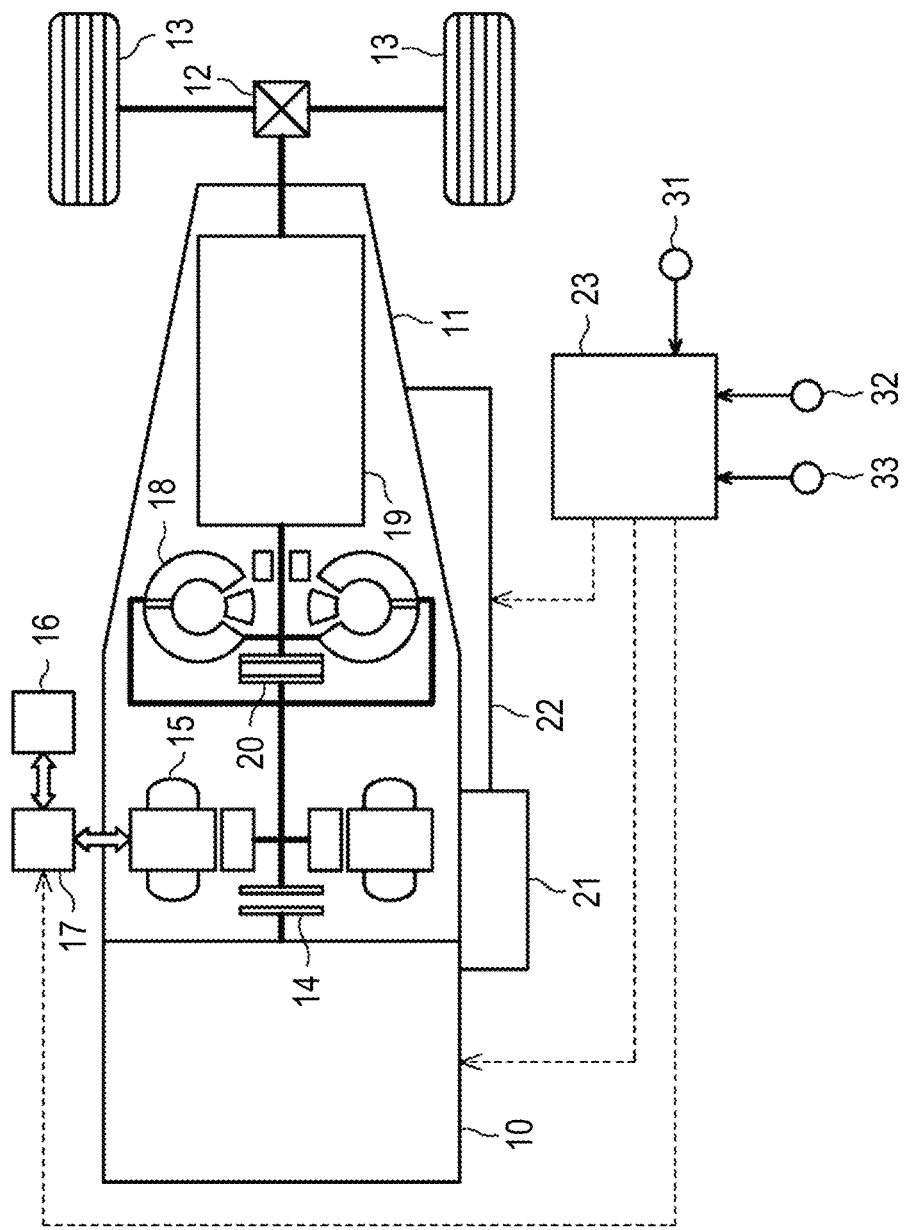
FIG. 1 is a diagram schematically illustrating a configuration of a control device for a hybrid electric vehicle according to an embodiment and the hybrid electric vehicle that is controlled by the control device.

As illustrated in FIG. 1, an engine 10 which is a drive source for traveling is mounted in a hybrid electric vehicle. A transmission unit 11 is provided in a power transmission path from the engine 10 to driving wheels 13 in the hybrid electric vehicle. The transmission unit 11 and the right and left driving wheels 13 are connected to each other via a differential 12.

A clutch 14 and a motor generator 15 are provided in the transmission unit 11. In the transmission unit 11, the motor generator 15 is installed on the power transmission path from the engine 10 to the driving wheels 13. The clutch 14 is installed to be located in a part between the engine 10 and the motor generator 15 on the power transmission path. When a hydraulic pressure is supplied, the clutch 14 is engaged to set up transmission of power between the engine 10 and the motor generator 15. When supply of a hydraulic pressure is stopped, the clutch 14 is disengaged to cut off the transmission of power between the engine 10 and the motor generator 15.

The motor generator 15 is connected to a battery 16 via an inverter 17. The motor generator 15 serves as a motor that generates a driving force for the hybrid electric vehicle with supply of electric power from the battery 16. The motor generator 15 also serves as a power generator that generates electric power which charges the battery 16 with transmission of power from the engine 10 or the driving wheels 13. Electric power that is transmitted and received between the motor generator 15 and the battery 16 is adjusted by the inverter 17. In this way, the hybrid electric vehicle includes the motor generator 15 and the engine 10 as drive sources.

The transmission unit 11 includes a torque converter 18 and an automatic transmission 19. The torque converter 18 is a fluid coupling having a torque amplification function. The automatic transmission 19 is a stepped transmission that switches a gear ratio between a plurality of steps by switching a gear shift stage. In the transmission unit 11, the automatic transmission 19 is disposed in a part closer to the driving wheels 13 than to the motor generator 15 on the power transmission path from the engine 10 to the driving wheels 13. The motor generator 15 and the automatic transmission 19 are connected via the torque converter 18. The torque converter 18 includes a lockup clutch 20. When a hydraulic pressure is supplied, the lockup clutch 20 is engaged to directly connect the motor generator 15 and the automatic transmission 19.

The transmission unit 11 includes an oil pump 21 and a hydraulic pressure control unit 22. A hydraulic pressure generated by the oil pump 21 is supplied to the hydraulic pressure control unit 22. Hydraulic circuits of the clutch 14, the torque converter 18, the automatic transmission 19, and the lockup clutch 20 are provided in the hydraulic pressure control unit 22. Various hydraulic pressure control valves for controlling hydraulic pressures in the clutch 14, the torque converter 18, the automatic transmission 19, and the lockup clutch 20 are provided in the hydraulic circuits.

As illustrated in FIG. 1, the hybrid electric vehicle includes a control device 23. The control device 23 is configured as an electronic control unit including a processing circuit that performs various arithmetic operations associated with control of the hybrid electric vehicle and a storage device in which control programs or data is stored.

The control device 23 adjusts transmission and reception of electric power between the motor generator 15 and the battery 16 by controlling the inverter 17. Accordingly, the control device 23 controls the motor generator 15. The control device 23 also controls the clutch 14, the lockup clutch 20, and the automatic transmission 19 by controlling the hydraulic pressure control unit 22. The control device 23 also controls the engine 10.

Detection signals from various sensors that detect an operating state of the engine 10 are input to the control device 23. The sensors of which detection signals are input to the control device 23 include a crank position sensor 31, an accelerator position sensor 32, and a vehicle speed sensor 33. The crank position sensor 31 outputs a crank angle signal corresponding to a change in rotational phase of a crank shaft which is an output shaft of the engine 10. The accelerator position sensor 32 detects an amount of operation of an accelerator pedal. The vehicle speed sensor 33 detects a vehicle speed of the hybrid electric vehicle.

Detection signals from the sensors are input to the control device 23. The control device 23 ascertains an operating state of the engine 10 based on the input detection signals. For example, the control device 23 calculates an engine rotation speed Neng which is a rotation speed of the crank shaft based on the crank angle signal input from the crank position sensor 31.

Information of a current, a voltage, and a temperature of the battery 16 is also input to the control device 23. The control device 23 calculates a state of charge SOC which is an index value of a charged state of the battery 16 based on the information of the current, the voltage, and the temperature of the battery 16. The state of charge SOC is a ratio of a residual charging capacity to a total charging capacity of the battery 16. The control device 23 ascertains a gear shift stage and a gear ratio which are selected in the automatic transmission 19 by controlling the hydraulic pressure control valves of the hydraulic pressure control unit 22. The control device 23 also ascertains an engagement state of the clutch 14 and an engagement state of the lockup clutch 20. For example, the control device 23 ascertains an engagement factor in which a state in which the clutch 14 is fully disengaged is defined as 0 and a state in which the clutch 14 is fully engaged is defined as 1 as the engagement state.

The control device 23 controls the engine 10 based on such information. The control device 23 ascertains and controls a rotation speed Nmg and a torque TRQmg of the motor generator 15 by controlling the inverter 17. That is, the control device 23 performs control of the rotation speed Nmg and the torque TRQmg of the motor generator 15 and charging/discharging control of the battery 16.

Control of Hybrid Electric Vehicle

Control of the hybrid electric vehicle which is performed by the control device 23 will be described below. The control device 23 calculates a required driving force which is a required value of a driving force for the hybrid electric vehicle based on the accelerator operation amount and the vehicle speed. The control device 23 determines a torque distribution of the engine 10 and the motor generator 15 based on the required driving force, the state of charge SOC, and the like. The control device 23 determines a gear shift stage in the automatic transmission 19. The control device 23 controls the torque TRQeng of the engine 10 and the torque TRQmg of the motor generator 15. The control device 23 controls the clutch 14 and the lockup clutch 20 or changes the gear shift stage of the automatic transmission 19.

The control device 23 may charge the battery 16 with electric power generated by causing the motor generator 15 to serve as a power generator. In the hybrid electric vehicle, resistance of the motor generator 15 generated through the power generation may be used as a brake. The brake based on resistance of the motor generator 15 through the power generation is referred to as a regenerative brake. The control device 23 controls the regenerative brake by controlling the inverter 17.

Motor-Driven Traveling and Hybrid Traveling

The hybrid electric vehicle having the aforementioned configuration can perform hybrid traveling in which the driving wheels 13 are driven using the engine 10 and the motor generator 15.

Specifically, in the hybrid traveling, the control device 23 sets up transmission of a driving force between the motor generator 15 and the engine 10 using the clutch 14 by engaging the clutch 14. In this state, for example, the control device 23 performs power generation using the motor generator 15 while causing the hybrid electric vehicle to travel with the driving force of the engine 10. In the hybrid traveling, the control device 23 determines the torque distribution of the engine 10 and the motor generator 15 such that the required driving force is realized as described above. The control device 23 controls the torque TRQeng of the engine 10 and the torque TRQmg of the motor generator 15 based on the determined torque distribution. In this way, the control device 23 causes the hybrid electric vehicle to travel with the driving force of the engine 10 and the driving force of the motor generator 15 in the hybrid traveling.

The hybrid electric vehicle can perform motor-driven traveling in which the driving wheels 13 are driven using only the motor generator 15 by driving the motor generator 15 using electric power stored in the battery 16.

Specifically, in the motor-driven traveling, the control device 23 stops the operation of the engine 10 and disengages the clutch 14 to cut off the transmission of power between the motor generator 15 and the engine 10. In this state, the control device 23 causes the hybrid electric vehicle to travel using the driving force of the motor generator 15.

In the hybrid electric vehicle, braking using the regenerative brake based on power generation in the motor generator 15 is performed in the motor-driven traveling.

Transition Control

Transition control will be described below with reference to FIGS. 2A to 2D.

Transition control is control that is performed by the control device 23 when the traveling state transitions from the motor-driven traveling in a state in which the transmission of a driving force between the engine 10 and the motor generator 15 has been cut off to the state in which the clutch 14 is engaged to set up the transmission of a driving force.

Figure 2A:
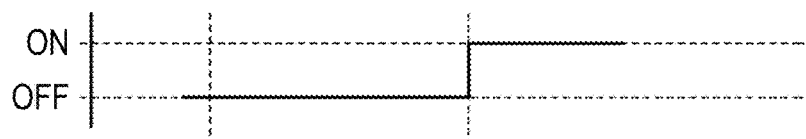
FIG. 2A is a timing chart illustrating transition control at the time of starting an engine, where a change of a rotation synchronized state is illustrated.
Figure 2B:
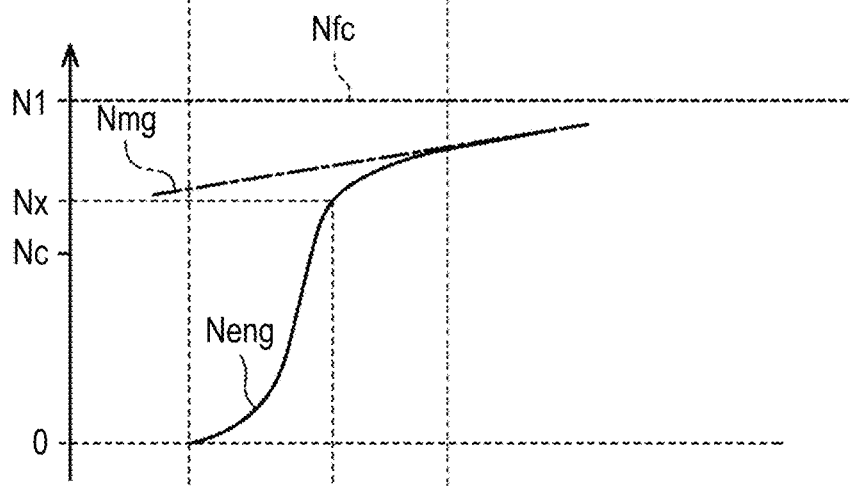
FIG. 2B is a timing chart illustrating transition control at the time of starting the engine, where a change of a rotation speed is illustrated.

As illustrated in FIG. 2B, at time T1, the engine rotation speed Neng is 0. As illustrated in FIG. 2D, at time T1, the torque TRQeng of the engine 10 is 0. That is, at the time point T1, the engine 10 stops.

Figure 2C:
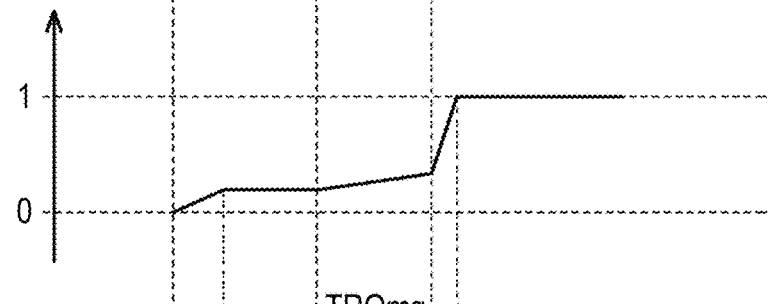
FIG. 2C is a timing chart illustrating transition control at the time of starting an engine, where a change of an engagement factor of a clutch is illustrated.
Figure 2D:
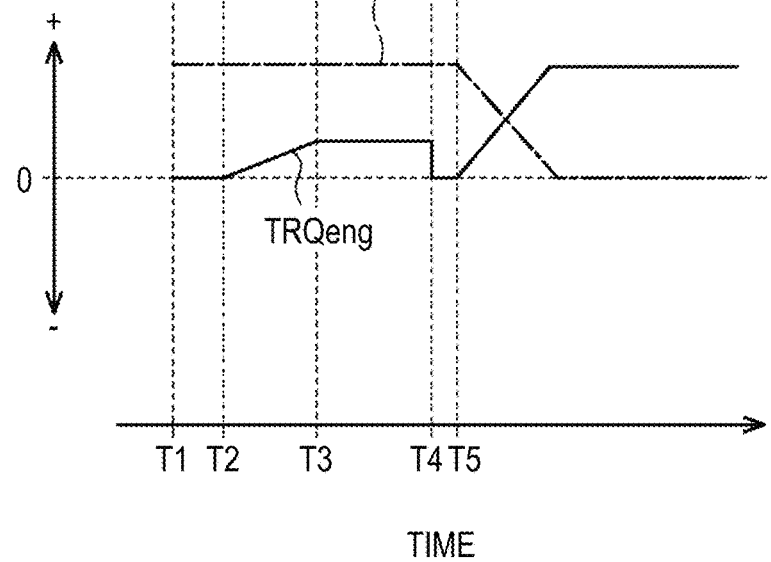
FIG. 2D is a timing chart illustrating transition control at the time of starting the engine, where a change of a torque is illustrated.

As illustrated in FIG. 2C, at time T1, the engagement factor of the clutch 14 is 0. That is, the clutch 14 is disengaged.

On the other hand, as indicated by a one-dot chain line in FIG. 2B, at time T1, the rotation speed Nmg of the motor generator 15 has a positive value. As indicated by a one-dot chain line in FIG. 2D, at time T1, the torque TRQmg of the motor generator 15 has a positive value. That is, at time T1, the hybrid electric vehicle is performing motor-driven traveling in which the hybrid electric vehicle travels using only the driving force of the motor generator 15.

At time T1, when transition control for engaging the clutch 14 to transition to a state in which the transmission of a driving force is set up is started, the control device 23 starts the engine 10. Specifically, first, the control device 23 operates the clutch 14 to an engagement side and gradually increases the engagement factor as illustrated in FIG. 2C. Accordingly, since a driving force is transmitted from the motor generator 15 to the engine 10 via the clutch 14, the engine rotation speed Neng increases as illustrated in FIG. 2B. That is, the engine 10 is cranked using a part of the torque TRQmg of the motor generator 15.

At time T2 at which the engine 10 is cranked, the control device 23 starts fuel injection and ignition in the engine 10. Accordingly, the torque TRQeng of the engine 10 increases as illustrated in FIG. 2D. Accordingly, the engine rotation speed Neng increases further as illustrated in FIG. 2B.

In controlling the engine 10, the control device 23 may perform fuel cutoff in which fuel injection is stopped. The control device 23 sets a fuel-cutoff-permission rotation speed Nfc at which execution of fuel cutoff is permitted and a return rotation speed Nc. The control device 23 permits execution of fuel cutoff based on the premise that the engine rotation speed Neng is equal to or lower than the fuel-cutoff-permission rotation speed Nfc. When the engine rotation speed Neng becomes less than the return rotation speed Nc while fuel cutoff is being performed, the control device 23 ends fuel cutoff and restarts fuel injection.

When the fuel-cutoff-permission rotation speed Nfc and the return rotation speed Nc are excessively close to each other, hunting in which execution and stopping of fuel cutoff are repeated is likely to occur. Therefore, the control device 23 calculates the fuel-cutoff-permission rotation speed Nfc by adding an addition value to the return rotation speed Nc. Specifically, a sum obtained by adding an addition value to the return rotation speed Nc is set as the fuel-cutoff-permission rotation speed Nfc. The return rotation speed Nc is set based on a lower limit of the engine rotation speed Neng at which the operation of the engine 10 can be continuously performed by restarting fuel injection. The magnitude of the addition value is set to a magnitude with which occurrence of hunting can be curbed based on results of experiment or simulation which has been performed in advance.

When the engine is started, there is a likelihood that a combustion state will be unstable and the engine rotation speed Neng will overshoot. At this time, when the fuel-cutoff-permission rotation speed Nfc is set to a lower value, the engine rotation speed Neng easily exceeds the fuel-cutoff-permission rotation speed Nfc. As a result, fuel cutoff is performed and starting is likely to fail. Therefore, when the engine is started, the control device 23 performs an increasing process of setting the fuel-cutoff-permission rotation speed Nfc to a greater value in a predetermined period, for example, several seconds.

Specifically, the control device 23 sets a first rotation speed N1 which is a sum obtained by adding a first addition value to the return rotation speed Nc as the fuel-cutoff-permission rotation speed Nfc. The first addition value is greater than a second addition value which is added to the return rotation speed Nc when the engine 10 is operating. The fuel-cutoff-permission rotation speed Nfc which is set when the increasing process is not being performed is a second rotation speed N2 which is a sum obtained by adding the second addition value to the return rotation speed Nc.

In this way, the first rotation speed N1 set in the increasing process is higher than the second rotation speed N2 set when the increasing process is not performed. The control device 23 curbs starting failure of the engine 10 by performing the increasing process.

As illustrated in FIG. 2B, at time T3, when the engine rotation speed Neng is equal to or greater than a determination value Nx, the control device 23 starts a rotation synchronization process. The determination value Nx is a threshold value for determining that the engine 10 has transitioned to an autonomous operating state in which the operation based on combustion can be continuously performed.

The rotation synchronization process is a process of smoothly synchronizing the engine rotation speed Neng with the rotation speed Nmg of the motor generator 15 by gradually increasing the engagement factor of the clutch 14. Specifically, in the rotation synchronization process, the control device 23 gradually increases the engagement factor of the clutch 14 as illustrated in FIG. 2C in a state in which the torque TRQeng of the engine 10 is kept constant as illustrated in FIG. 2D. Accordingly, the engine rotation speed Neng becomes close to the rotation speed Nmg of the motor generator 15 as illustrated in FIG. 2B.

When a difference between the engine rotation speed Neng and the rotation speed Nmg of the motor generator 15 becomes extremely small as illustrated in FIG. 2B, the control device 23 determines that rotation synchronization has been completed at time T4 and ends the rotation synchronization process as illustrated in FIG. 2A. Then, the control device 23 rapidly fully engages the clutch 14 as illustrated in FIG. 2C. At this time, the control device 23 decreases the torque TRQeng of the engine 10 by delaying an ignition timing. Accordingly, it is possible to curb sudden change of a driving force due to sudden change of the engagement factor of the clutch 14.

As illustrated in FIG. 2C, the engagement factor of the clutch 14 is 1 at time T5. At time T5, when it is determined that engagement of the clutch 14 has been completed, the control device 23 starts a torque interchanging process. The torque interchanging process is a process of gradually decreasing the torque TRQmg of the motor generator 15 while gradually increasing the torque TRQeng of the engine 10 as illustrated in FIG. 2D. In this way, the drive source is switched from the motor generator 15 to the engine 10 by gradually interchanging the torque of the drive source from the torque TRQmg to the torque TRQeng.

When the torque interchanging process ends in this way, the control device 23 ends the transition control.

Battery Protecting Process

When braking based on the regenerative brake is performed in a state in which the state of charge SOC of the battery 16 is close to 100%, the state of charge of the battery 16 becomes excessive. On the other hand, when power generation using the motor generator 15 is limited to avoid an excessive state of charge, a braking force of the regenerative brake decreases.

Therefore, when the state of charge SOC of the battery 16 is equal to or greater than a threshold value Xmax in motor-driven traveling, the control device 23 starts the engine 10 to engage the clutch 14. Then, the control device 23 performs a battery protecting process of operating the engine brake in a state in which the transmission of power between the engine 10 and the motor generator 15 is set up in this way. Through this battery protecting process, it is possible to supply a braking force which cannot be supplied by the regenerative brake from the engine brake while curbing an excessive state of charge of the battery 16. The threshold value Xmax is a threshold value for determining whether the battery protecting process is to be performed. The threshold value Xmax is a value less than 100%. The magnitude of the threshold value Xmax is set based on results of experiment or simulation which has been performed in advance such that an opportunity of execution of the regenerative brake can be sufficiently secured and an excessive state of charge can be curbed.

When the engine 10 is started to engage the clutch 14, a shock due to the engagement of the clutch 14 is curbed by controlling the torque TRQeng of the engine 10 through the transition control. When the engine 10 is started, the fuel-cutoff-permission rotation speed Nfc is increased and set to the first rotation speed N1 through the increasing process. However, when the fuel-cutoff-permission rotation speed Nfc is high, it is difficult to perform fuel cutoff. Accordingly, even when the state of charge SOC of the battery 16 becomes equal to or greater than the threshold value Xmax and the battery protecting process is preformed, a braking force based on the engine brake may not be generated immediately.

This event will be described below in detail with reference to FIGS. 3A to 3E. FIGS. 3A to 3E are timing charts illustrating an example, in which the increasing process is performed similarly to the transition control described above with reference to FIGS. 2A to 2D. FIGS. 3A to 3E illustrate an example of transition control in which the state of charge SOC becomes equal to or greater than the threshold value Xmax and the battery protecting process is performed while decelerated traveling in motor-driven traveling is performed and braking based on the regenerative brake is being performed.

Transition Control According to Comparative Example

As illustrated in FIG. 3C, at time T1, the engine rotation speed Neng is 0. As illustrated in FIG. 3E, at time T1, the torque TRQeng of the engine 10 is 0. That is, at the time point T1, the engine 10 stops.

As illustrated in FIG. 3D, at time T1, the engagement factor of the clutch 14 is 0. That is, the clutch 14 is disengaged.

On the other hand, as indicated by a one-dot chain line in FIG. 3C, at time T1, the rotation speed Nmg of the motor generator 15 has a positive value. As indicated by a one-dot chain line in FIG. 3E, at time T1, the torque TRQmg of the motor generator 15 has a negative value. That is, at time T1, the hybrid electric vehicle is performing motor-driven traveling and is performing braking based on the regenerative brake.

At time T1, when transition control is started, first, the control device 23 operates the clutch 14 to an engagement side and gradually increases the engagement factor as illustrated in FIG. 3D. Accordingly, the engine 10 is cranked. In this way, starting of the engine 10 is started. At this time, the increasing process is performed and the fuel-cutoff-permission rotation speed Nfc is set to the first rotation speed N1 as illustrated in FIG. 3C.

At time T2 at which the engine 10 is cranked, the control device 23 starts fuel injection and ignition in the engine 10. Accordingly, the torque TRQeng of the engine 10 increases as illustrated in FIG. 3E. Accordingly, the engine rotation speed Neng increases further as illustrated in FIG. 3C.

As illustrated in FIG. 3C, at time T3, when the engine rotation speed Neng is equal to or greater than the determination value Nx, the control device 23 starts the rotation synchronization process. In the rotation synchronization process, the control device 23 gradually increases the engagement factor of the clutch 14 as illustrated in FIG. 3D in a state in which the torque TRQeng of the engine 10 is kept constant as illustrated in FIG. 3E. Accordingly, the engine rotation speed Neng becomes close to the rotation speed Nmg of the motor generator 15 as illustrated in FIG. 3C.

When a difference between the engine rotation speed Neng and the rotation speed Nmg of the motor generator 15 becomes extremely small at time T4 as illustrated in FIG. 3C, the control device 23 determines that rotation synchronization has been completed at time T4 and ends the rotation synchronization process as illustrated in FIG. 3A. Then, the control device 23 rapidly and fully engages the clutch 14 as illustrated in FIG. 3D. At this time, the control device 23 decreases the torque TRQeng of the engine 10 by delaying the ignition timing. Accordingly, it is possible to curb sudden change of a driving force due to sudden change of the engagement factor of the clutch 14.

As illustrated in FIG. 3D, the engagement factor of the clutch 14 is 1 at time T5. At time T5, when it is determined that engagement of the clutch 14 has been completed, the control device 23 starts the torque interchanging process.

At time T6, the torque TRQeng of the engine 10 reaches a minimum torque in a combustion operation. However, at this time, since the engine rotation speed Neng is higher than the fuel-cutoff-permission rotation speed Nfc, execution of fuel cutoff is not permitted. Accordingly, the control device 23 continues to perform fuel injection in a state in which the torque TRQeng of the engine 10 is maintained at the minimum torque.

At time T7, when a period in which the increasing process is performed ends, the fuel-cutoff-permission rotation speed Nfc is set to the second rotation speed N2 which is lower than the first rotation speed N1. Accordingly, since the engine rotation speed Neng is less than the fuel-cutoff-permission rotation speed Nfc, the control device 23 turns a fuel cutoff signal on to perform fuel cutoff as illustrated in FIG. 3B. The transition control ends in this way.

When the fuel-cutoff-permission rotation speed Nfc is set to a high value through the increasing process in this way, the engine rotation speed Neng after the engine has been started is higher than the fuel-cutoff-permission rotation speed Nfc and thus fuel cutoff is not performed. Accordingly, starting of braking based on the engine brake is delayed. In the example illustrated in FIG. 3B, the engine 10 is operated at the minimum torque until time T7.

When the engine 10 is started to perform braking based on the engine brake through the battery protecting process, it is preferable to rapidly generate a braking force based on the engine brake. Therefore, when the engine is started through the battery protecting process, the control device 23 according to this embodiment does not perform the increasing process and sets the fuel-cutoff-permission rotation speed Nfc to the second rotation speed N2 lower than the first rotation speed N1.

Setting of Fuel-Cutoff-Permission Rotation Speed Nfc in Control Device 23

A routine which is performed by the control device 23 according to this embodiment at the time of deceleration in motor-driven traveling will be described below with reference to FIG. 4.

Figure 4:
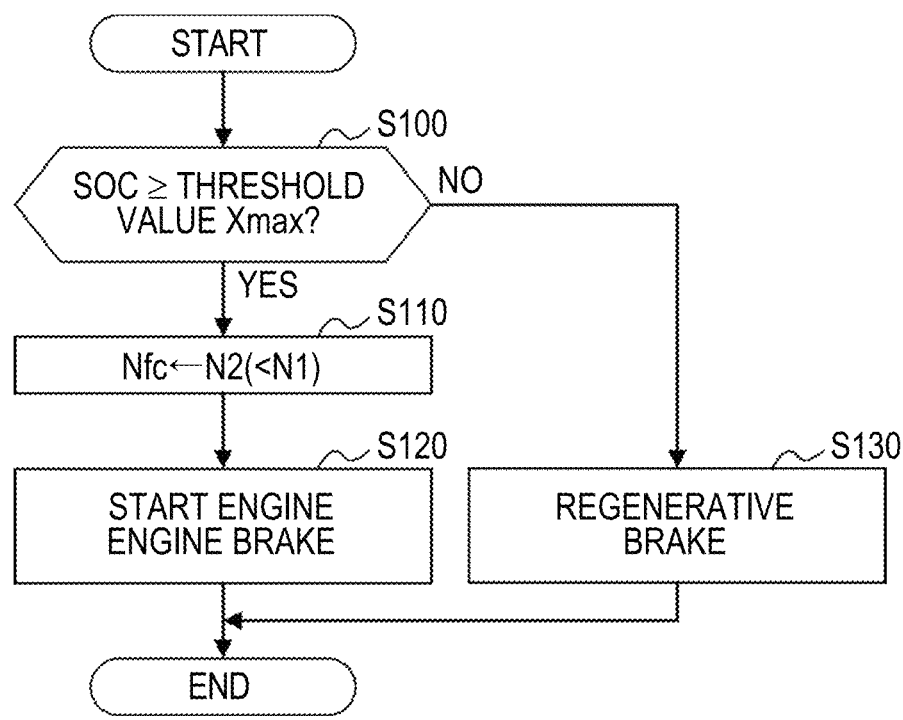
FIG. 4 is a flowchart illustrating a routine which is performed by the control device at the time of deceleration in motor-driven traveling.

The control device 23 repeatedly performs the routine illustrated in FIG. 4 at the time of deceleration in motor-driven traveling. This routine is a routine for selecting whether the regenerative brake is used or the engine brake is used to perform braking at the time of deceleration in motor-driven traveling.

As illustrated in FIG. 4, when the routine starts, the control device 23 first determines whether the state of charge SOC is equal to or greater than the threshold value Xmax in Step S100. When it is determined in Step S100 that the state of charge SOC is less than the threshold value Xmax (Step S100: NO), the control device 23 causes the routine to proceed to Step S130.

In Step S130, the control device 23 selects that braking is performed based on the regenerative brake and temporarily ends the routine.

On the other hand, when it is determined in Step S100 that the state of charge SOC is equal to or greater than the threshold value Xmax (Step S100: YES), the control device 23 causes the routine to proceed to Step S110.

In Step S110, the control device 23 sets the fuel-cutoff-permission rotation speed Nfc to the second rotation speed N2 lower than the first rotation speed N1. Then, in Step S120, the control device 23 starts the engine 10 to engage the clutch 14, selects braking based on the engine brake, and temporarily ends the routine. That is, in this case, the control device 23 does not perform the increasing process and sets the fuel-cutoff-permission rotation speed Nfc to the second rotation speed N2 lower than the first rotation speed N1.

When transition control has been completed already and the clutch 14 is in the engaged state at the time of performing Step S120, the control device 23 does not start the engine 10 in Step S120. That is, in this case, the control device 23 selects braking based on the engine brake in Step S120 and temporarily ends the routine.

Operations in Embodiment

Transition control which is performed by the control device 23 according to this embodiment performing the routine will be described below with reference to FIGS. 5A to 5E. The timing charts illustrated in FIGS. 5A to 5E illustrate the transition control of the control device 23 according to this embodiment in the same situation as in the comparative example described above with reference to FIGS. 3A to 3E.

In this situation, since the state of charge SOC is equal to or greater than the threshold value Xmax (S100: YES), the control device 23 sets the fuel-cutoff-permission rotation speed Nfc to the second rotation speed N2 lower than the first rotation speed N1 (S110).

It is determined that rotation synchronization has been completed at time T4 as illustrated in FIG. 5A, and the clutch 14 is fully engaged until time T5 as illustrated in FIG. 5D. Then, the torque interchanging process is performed at time T5. The processes up to now are the same as in the comparative example described above with reference to FIGS. 3A to 3E.

However, the fuel-cutoff-permission rotation speed Nfc is the second rotation speed N2 as illustrated in FIG. 5C.

As illustrated in FIG. 5E, the torque TRQeng of the engine 10 reaches the minimum torque in the combustion operation at time T6. At this time, since the engine rotation speed Neng is lower than the fuel-cutoff-permission rotation speed Nfc as illustrated in FIG. 5C, execution of fuel cutoff is permitted. As illustrated in FIG. 5B, the control device 23 turns the fuel cutoff signal on. Then, the control device 23 ends the torque interchanging process and performs fuel cutoff. In this way, the transition control ends at time T6.

In the control device 23 according to this embodiment, a period in which execution of fuel cutoff is suspended and the engine 10 is operated with the minimum torque as in the comparative example described above with reference to FIGS. 3A to 3E is not present. That is, the control device 23 according to this embodiment can generate a braking force based on the engine brake by more rapidly performing fuel cutoff.

Advantages in Embodiment (1) The control device 23 sets the fuel-cutoff-permission rotation speed Nfc to the second rotation speed N2 lower than the first rotation speed N1 when the engine is started through the battery protecting process. Accordingly, the control device 23 can perform fuel cutoff at a lower engine rotation speed Neng in comparison with a case in which the fuel-cutoff-permission rotation speed Nfc is set to the first rotation speed N1. Accordingly, when the transmission of a driving force between the engine 10 and the motor generator 15 is set up, fuel cutoff can be more easily performed. As a result, the control device 23 can rapidly generate a braking force based on the engine brake when the state of charge SOC of the battery 16 is equal to or greater than the threshold value Xmax.

(2) When the engine is started, the control device 23 performs the increasing process and sets the fuel-cutoff-permission rotation speed Nfc to the second rotation speed N2 which is a sum obtained by adding the second addition value to the return rotation speed Nc. Accordingly, the control device 23 can curb a starting failure of the engine 10.

(3) The control device 23 performs the torque interchanging process. Accordingly, the control device 23 can curb fluctuation of a driving force in completing transition to motor-driven traveling in a state in which the transmission of a driving force between the engine 10 and the motor generator 15 is set up.

(4) The control device 23 performs fuel cutoff and ends the torque interchanging process when the engine is started through the battery protecting process, and then ends the transition control. Accordingly, the control device 23 can rapidly generate a braking force based on the engine brake and rapidly end the transition control.

MODIFIED EXAMPLES

The embodiment can be modified as follows. The embodiment and the following modified examples can be combined unless technical conflictions arise.

In the embodiment, the torque interchanging process is performed after engagement of the clutch 14 has been completed, and then the transition control is ended. On the other hand, the torque interchanging process may be skipped.

In the embodiment, a hybrid electric vehicle that does not include a start motor and cranks the engine 10 using the motor generator 15 has been exemplified. On the other hand, the same control device 23 as in the embodiment may be applied to a hybrid electric vehicle that includes a starter motor and cranks the engine 10 using a driving force of the starter motor.

When the fuel-cutoff-permission rotation speed Nfc is originally set to a high value without performing the increasing process, fuel cutoff may not be performed immediately similarly to in the comparative example described above with reference to FIGS. 3A to 3E. As in the aforementioned embodiment, fuel cutoff can be easily performed by employing the configuration in which the fuel-cutoff-permission rotation speed Nfc is set to a low value when the state of charge SOC is equal to or greater than the threshold value Xmax at the time of deceleration in motor-driven traveling. Accordingly, as in the aforementioned embodiment, it is possible to rapidly generate a braking force based on the engine brake when the state of charge SOC of the battery 16 becomes equal to or greater than the threshold value Xmax.

The control device 23 is not limited to a configuration including the processing circuit and the storage device to perform software processes. For example, the control device 23 may include a dedicated hardware circuit such as an ASIC that performs at least some of the software processes performed in the aforementioned embodiment by hardware. That is, the control device 23 may have any of the following configurations (a) to (c): (a) a configuration including a processing circuit that performs all the processes in accordance with a program and a program storage device such as a ROM that stores the program; (b) a configuration including a processing circuit that performs some of the processes in accordance with a program, a program storage device, and a dedicated hardware circuit that performs the remaining processes; and (c) a configuration including a dedicated hardware circuit that performs all the processes. Here, the number of software execution devices including a processing device and a program storage device or the number of dedicated hardware circuits may be two or more.

What is claimed is:

1. A control device for a hybrid electric vehicle including a motor generator connected to driving wheels and an engine as drive sources, the hybrid electric vehicle being configured to set up or cut off transmission of a driving force between the motor generator and the engine using a clutch,
    wherein braking using a regenerative brake based on power generation in the motor generator is performed in motor-driven traveling in which the hybrid electric vehicle is traveling using a driving force of the motor generator in a state in which operation of the engine is stopped and the transmission of a driving force between the motor generator and the engine using the clutch is cut off, and a battery protecting process of starting the engine to set up the transmission of a driving force between the motor generator and the engine using the clutch and performing braking based on an engine brake is performed when a state of charge of the battery is equal to or greater than a threshold value in the motor-driven traveling, and
    wherein a fuel-cutoff-permission rotation speed which is a lower limit of an engine rotation speed at which execution of fuel cutoff in the engine is permitted is set to a first rotation speed when the engine is started, and the fuel-cutoff-permission rotation speed is set to a second rotation speed lower than the first rotation speed when the engine is started through the battery protecting process,
    wherein, in transition control for transitioning to a state in which the transmission of a driving force between the motor generator and the engine is set up using the clutch by starting the engine in the motor-driven traveling, a torque interchanging process of gradually decreasing a torque of the engine and gradually increasing a torque of the motor generator until the operation of the engine is stopped is performed after engagement of the clutch has been completed.

2. The control device for a hybrid electric vehicle according to claim 1, wherein the second rotation speed is a value obtained by adding a second addition value to a return rotation speed which is a lower limit of an engine rotation speed range in which maintenance of fuel cutoff is permitted, and
    wherein the first rotation speed is a value obtained by adding a first addition value greater than the second addition value to the return rotation speed.

3. The control device for a hybrid electric vehicle according to claim 1, wherein the transition control is ended by performing fuel cutoff and ending the torque interchanging process when the engine is started through the battery protecting process.

* * * * *